United States Patent
Borland et al.

(10) Patent No.: US 9,208,691 B2
(45) Date of Patent: Dec. 8, 2015

(54) MACHINE SYSTEM HAVING OVERTAKING FUNCTIONALITY

(71) Applicant: Caterpillar Inc., Peoria, IL (US)

(72) Inventors: Brad Kenneth Borland, Peoria, IL (US); Mathew Chacko, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 442 days.

(21) Appl. No.: 13/852,762

(22) Filed: Mar. 28, 2013

(65) Prior Publication Data
US 2014/0297103 A1    Oct. 2, 2014

(51) Int. Cl.
G08G 5/00     (2006.01)
G05D 1/02     (2006.01)
G08G 9/00     (2006.01)

(52) U.S. Cl.
CPC .............. *G08G 9/00* (2013.01); *G05D 1/0214* (2013.01)

(58) Field of Classification Search
CPC ............................... G08G 9/00; G05D 1/0214
USPC ......................................................... 701/117
See application file for complete search history.

(56) References Cited

U.S. PATENT DOCUMENTS

| | | | |
|---|---|---|---|
| 7,146,272 B2 | 12/2006 | Yanagidaira et al. | |
| 8,805,605 B2 * | 8/2014 | Cooper et al. | 701/93 |
| 2006/0239509 A1 * | 10/2006 | Saito | 382/104 |
| 2010/0315217 A1 | 12/2010 | Miura et al. | |
| 2010/0324775 A1 | 12/2010 | Kermani et al. | |
| 2013/0321195 A1 * | 12/2013 | Moriuchi et al. | 342/70 |
| 2015/0057907 A1 * | 2/2015 | Rebhan | 701/93 |

FOREIGN PATENT DOCUMENTS

| | | |
|---|---|---|
| EP | 1 457 947 | 10/2003 |
| JP | 2006-293615 | 10/2006 |

OTHER PUBLICATIONS http://www.tenneco.com/original_equipment/emission_control/products_and_technologies, © Copyright 2011, Tenneco Inc. (printed on Mar. 28, 2013).
http://www.gillet.com/en/scr_technology (printed on Mar. 28, 2013).

\* cited by examiner

*Primary Examiner* — Mary Cheung
*Assistant Examiner* — Frederick Brushaber
(74) *Attorney, Agent, or Firm* — Finnegan, Henderson, Farabow, Garrett & Dunner, LLP

(57) ABSTRACT

An overtaking control system is disclosed for use with a plurality of machines operating at a common worksite. The overtaking control system may have an input device that is configured to receive an input from an operator of the first machine of the plurality of machines indicative of a desire to overtake a second machine of the plurality of machines. The overtaking control system may also have a location device configured to generate a location signal indicative of a location of the first machine at the common worksite. The overtaking control system may further have at least one controller configured to make a comparison of a projected path of the first machine with a map of the common worksite based on the location signal, and selectively activate the input device only when the comparison indicates that the projected path of the first machine does not overlap with a no-overtaking zone at the common worksite.

20 Claims, 3 Drawing Sheets

MACHINE SYSTEM HAVING OVERTAKING FUNCTIONALITY

TECHNICAL FIELD

The present disclosure is directed to a machine system and, more particularly, a machine system having overtaking functionality.

BACKGROUND

Mobile machines such as haul trucks, motor graders, water trucks, service vehicles, and other large equipment are utilized at a common worksite to accomplish a variety of tasks. These machines can have different configurations, be used for different tasks, and have different capabilities. For example a service vehicle may travel more efficiently at a higher speed than a motor grader or a fully loaded haul truck. And in some situations, a higher-speed machine can find itself following a slower-speed machine. In these situations, it is desirable and/ or more productive for the higher-speed machine to overtake (i.e., to pass) the slower-speed machine. Care should be taken in these situations to ensure that overtaking is performed properly within designated overtaking zones (or away from designated no-overtaking zones).

One attempt to improve machine control during an overtaking situation is described in JP Patent Publication 2006-293615 of Hidetoshi that published on Oct. 26, 2006 ("the '615 publication"). In particular, the '615 publication discloses an overtaking support device for a vehicle. The overtaking support device determines when an overtaking request is received from a driver of a following vehicle or when the following vehicle is approaching an overtaking distance relative to a leading vehicle. The device confirms a location and travel direction of the following vehicle with a map, and extracts a turnout place that is available and/or a road section that is suitable for overtaking. The device then calculates a distance of the following vehicle to the turnout place or road section, and presents the distance to the driver of the following vehicle. The device additionally reports the overtaking intention of the following vehicle and the turnout place or the road section (and associated distances) to the leading vehicle through inter-vehicle communication means.

Although the device of the '615 publication may help manage overtaking events, it may still be problematic. In particular, the device does not account for driver intentions of the leading vehicle, which could contradict driver intentions of the following vehicle. In addition, the device does not consider current travel parameters of the vehicles or how those parameters could affect the ability of the following vehicle to overtake the leading vehicle. Further, the device does not inhibit the driver of the following vehicle from overtaking the leading vehicle when conditions are unsuitable for the maneuver.

The disclosed overtaking control system is directed to overcoming one or more of the problems set forth above and/or other problems of the prior art.

SUMMARY

One aspect of the present disclosure is directed to an overtaking control system for use with a plurality of machines operating at a common worksite. The overtaking control system may include an input device located within a cabin of a first machine of the plurality of machines. The input device is configured to receive an input from an operator of the first machine indicative of a desire to overtake a second machine of the plurality of machines. The overtaking control system may also include a location device associated with the first machine that is configured to generate a location signal indicative of a location of the first machine at the common worksite. The overtaking control system may further include at least one controller in communication with the input device and the location device. The at least one controller may be configured to make a comparison of a projected path of the first machine with a map of the common worksite based on the location signal. The at least one controller may further be configured to selectively activate the input device only when the comparison indicates that the projected path of the first machine does not overlap with a no-overtaking zone at the common worksite.

A second aspect of the present disclosure is directed to another overtaking control system for use with a plurality of machines operating at a common worksite. This overtaking control system may include an input device located within a cabin of a first machine of the plurality of machines. The input device may be configured to receive an input from an operator of the first machine indicative of a desire to overtake a second machine of the plurality of machines. The overtaking control system may also include a communication device associated with the first machine, and at least one controller in communication with the input device and the communication device. The at least one controller may be configured to detect receipt of the input from the operator via the input device, and to transmit to the second machine, via the communication device, a request to overtake the second machine based on the input. The at least one controller may be further configured to receive a response to the request from the second machine via the communication device, and to selectively allow the first machine to overtake or inhibit the first machine from overtaking the second machine based on the response.

A third aspect of the present disclosure is directed to a method of navigational control for a plurality of machines operating at a common worksite. The method may include making a comparison of a projected path of a first machine of the plurality of machines with a map of the common worksite, and selectively activating an input device only when the comparison indicates that the projected path of the first machine does not overlap with a no-overtaking zone. The method may further include receiving, via the input device only when the input device is activated, an input from an operator of the first machine that is indicative of a desire to overtake a second machine of the plurality of machines. The method may also include transmitting to the second machine a request to overtake the second machine, receiving a response to the request from the second machine, and selectively allowing the first machine to overtake or inhibiting the first machine from overtaking the second machine based on the response.

DETAILED DESCRIPTION

Figure 1:
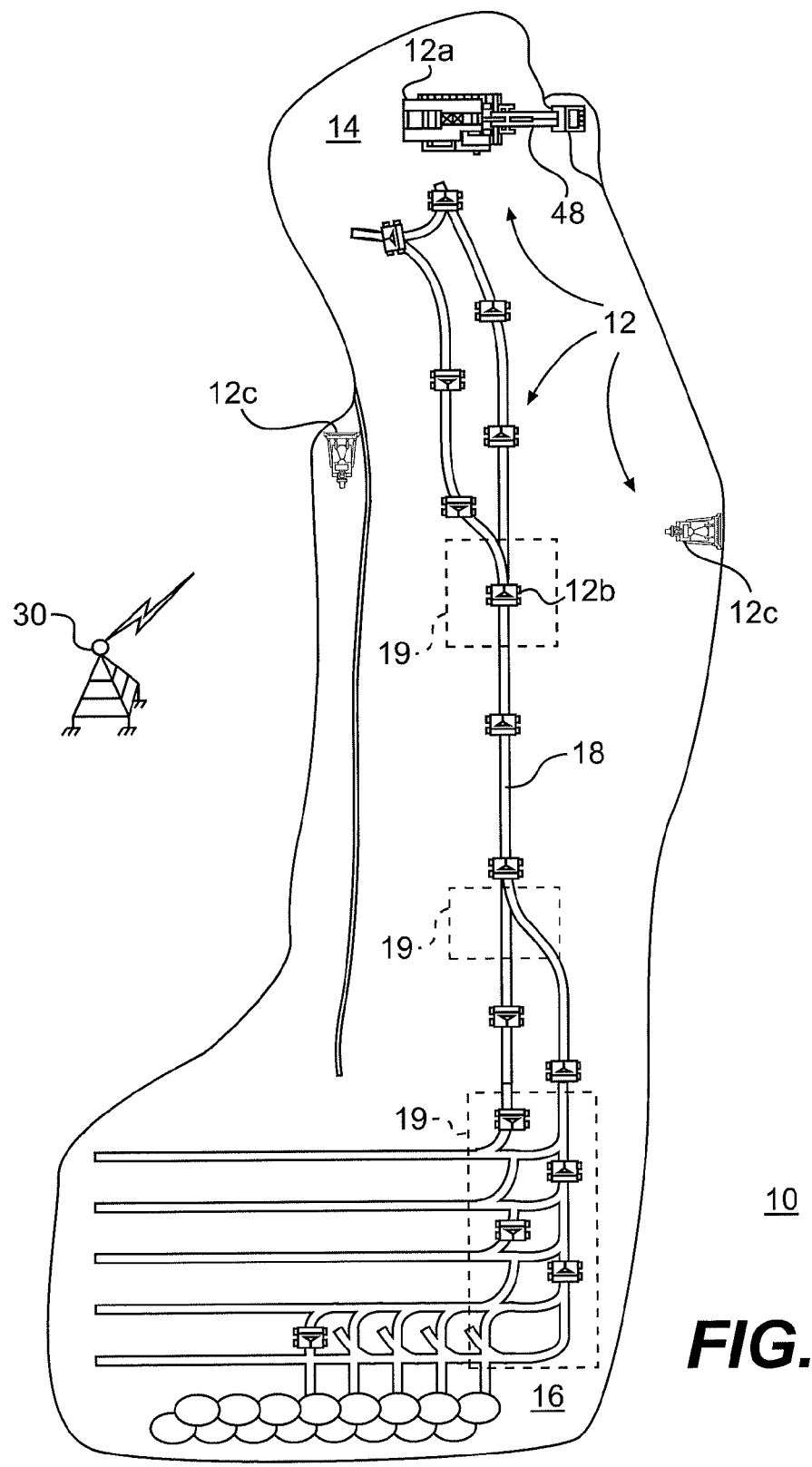
FIG. 1 is a diagrammatic illustration of an exemplary disclosed worksite.

FIG. 1 illustrates an exemplary worksite 10 with a plurality of mobile machines 12 performing different tasks at different locations of worksite 10. Worksite 10 may include, for example, a mine site, a landfill, a quarry, a construction site, a road worksite, or any other type of worksite. The tasks may be associated with any work activity appropriate at worksite 10, and may require machines 12 to generally traverse worksite 10.

Worksite 10 may include multiple locations designated for particular purposes. For example, a first location 14 may be designated as a load location, while a second location 16 may be designated as a dump location. One or more travel paths 18 may generally extend between load location 14 and dump location 16, and different zones may be established along travel path(s) 18 that can be used to regulate machine travel. For example, one or more zones may be established that are categorized as no-overtaking (i.e., no-passing) zones 19. These zones 19 may correspond, for instance, with an intersection, with a narrow section of travel path 18, with a tight corner, with poor visibility, with loose underfooting, with a steep grade, and/or with any other characteristic that could make an overtaking event unsuccessful. Within these zones 19, machines 12 may be inhibited from overtaking each other. It is contemplated that other categories of zones and/or locations may also be established at worksite 10, if desired.

Any number and types of machines 12 may simultaneously and cooperatively operate at worksite 10. For example, a first type of machine (e.g., an excavator) 12a may be stationed at load location 14 and assigned to fill a second type of machine (e.g., a haul truck) 12b with material. A third type of machine (e.g., a dozer, a motor grader, a water truck, and/or a service vehicle) 12c may be tasked with traveling up and down travel path(s) 18 to condition travel path(s) 18, to clean up load and/or dump locations 14, 16, and/or to service other machines 12 at any location of worksite 10. Machines 12 may be self-directed machines configured to autonomously traverse the changing terrain of worksite 10, manned machines configured to traverse worksite 10 under the control of an operator, or hybrid machines configured to perform some functions autonomously and other functions under the control of an operator.

Each of the different types of machines 12a-12c (and other types) may move about worksite 10 completing their assigned tasks at different speeds. For example, an excavator or dozer may travel relatively slowly, while a haul truck or water truck may travel somewhat faster. A service truck may travel even faster than a haul truck. When a faster machine 12 follows a slower machine 12, the faster machine 12 may suffer productivity and/or efficiency losses. Accordingly, there may be a periodic need for the faster machine 12 to overtake the slower machine 12 when the machines are outside of no-overtaking zones 19.

Figure 2:
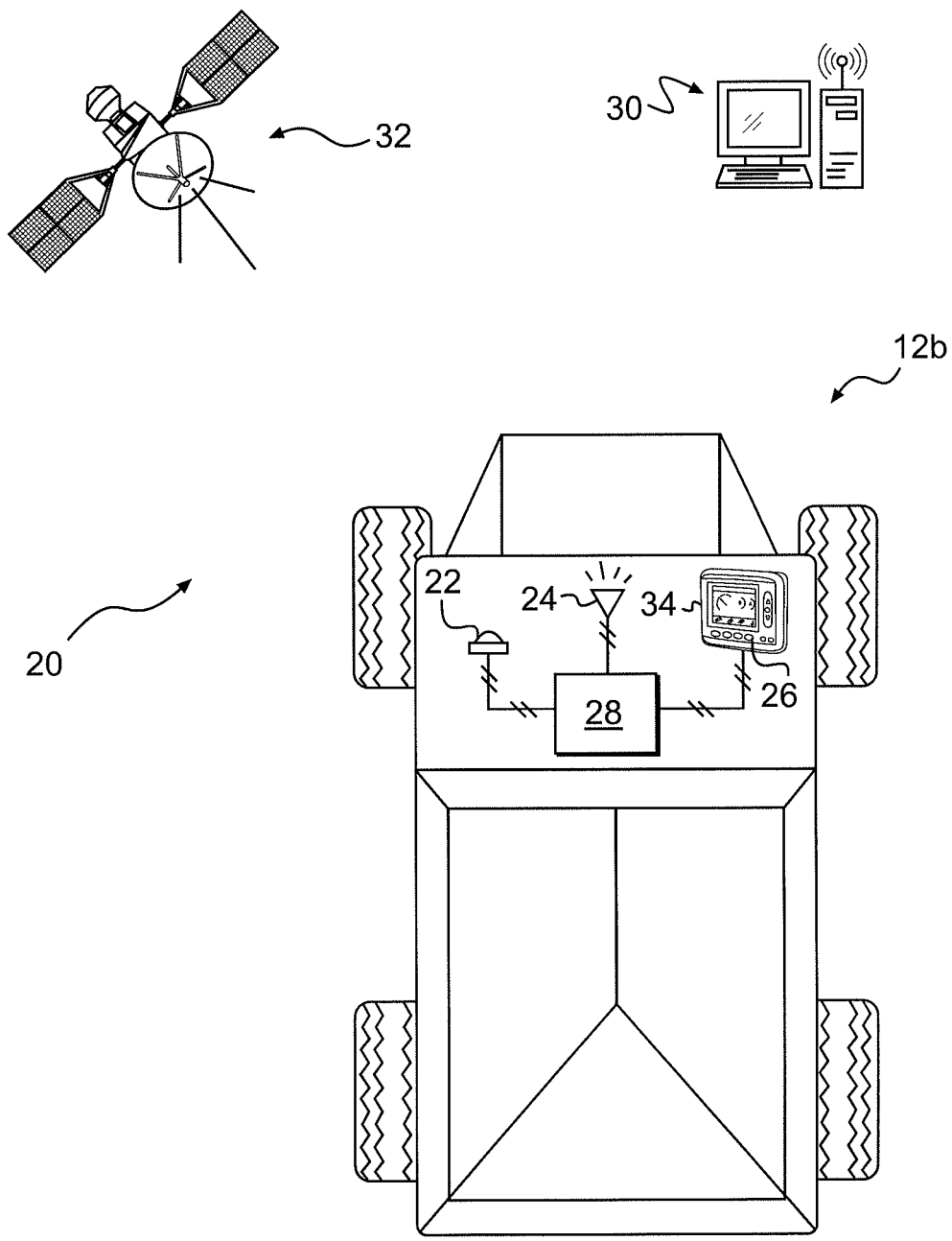
FIG. 2 is a diagrammatic illustration of an exemplary disclosed overtaking control system that may be used to manage the worksite of FIG. 1.

As shown in FIG. 2, each machine 12 (haul truck shown by way of example only) may be equipped with components of an overtaking control system 20 that facilitate control of overtaking events. Overtaking control system 20 may include, among other things, a locating device 22, a communication device 24, an operator input device 26, and an onboard controller 28 in communication with each of locating device 22, communication device 24, and input device 26. Overtaking control system 20 may additionally include an offboard or worksite controller 30 in communication with each onboard controller 28 via corresponding communication devices 24.

As each machine 12 travels about worksite 10, a Global Navigation Satellite System (GNSS) or other tracking device or system 32 may communicate with locating device 22 to monitor the movements of machine 12 and generate corresponding location signals. The location signals may be directed to onboard controller 28 for comparison with an electronic map of worksite 10 and for further processing. The further processing may include, among other things, determining a current location of each machine 12, a distance between machines 12, speeds of machines 12, projected travel paths of machines 12, and/or locations of machines 12 relative to areas of worksite 10 (e.g., relative to no-overtaking zones 19).

Communication device 24 may facilitate communication between onboard controllers 28 and/or between onboard controllers 28 and worksite controller 30. This communication may include, for example, the coordinates, speeds, and/or projected travel paths of machines 12 generated based on signals from locating device 22, and requests and responses to requests generated by input devices 26. Data messages associated with overtaking control system 20 may be sent and received via a wireless communication link. The wireless communications may include satellite, cellular, infrared, and any other type of wireless communications that enable communicating device 24 to exchange information between worksite controller 30 and onboard controllers 28.

Input device 26 may be any appropriate type of device that provides an interface for receiving requests, responses to requests, and/or instructions from the operator of machine 12. For example, input device 26 may be a button or switch that, when pressed by the operator, generates a signal indicative of a desire for a first machine 12 to overtake a second machine 12 that is traveling ahead of the first machine 12. In another example, the same or another button or switch may generate a signal indicative of a response to the request to overtake (e.g., an affirmative response or a negative response). In the disclosed embodiment, input device 26 is an electronic button that forms a portion of a touch screen display 34. In this embodiment, in addition to receiving the signal from input device 26 via display 34, controller 28 may also be able to selectively activate or deactivate input device 26 for use by the operator. This may allow controller 28 to regulate enablement of an overtaking function, as will be described in more detail below. Display 34, in addition to providing a support location for input device 26 and connection to controller 28, may itself also be in communication with controller 28 and a selectively caused to show information (e.g., maps, machine locations, inter-machine communications, and/or instructions) associated with operation of machines 12 at worksite 10.

Controller 28 may embody a single microprocessor or multiple microprocessors that include a means for monitoring, processing, recording, indexing, and/or communicating the location signal and input received from device 26, and for showing information regarding characteristics of machine 12 and the environment on display 34. For example, controller 28 may include a storage device, a clock, and a processor, such as a central processing unit or any other means for accomplishing a task consistent with the present disclosure. Numerous commercially available microprocessors can be configured to perform the functions of controller 28. It should be appreciated that controller 28 could readily embody a general machine controller capable of controlling numerous other machine functions. Various other known circuits may be associated with controller 28, including signal-conditioning circuitry, communication circuitry, and other appropriate circuitry.

Worksite controller 30 may include any means for monitoring, recording, storing, indexing, processing, and/or communicating various operational aspects of worksite 10 and machines 12. These means may include components such as, for example, a memory, one or more data storage devices, a central processing unit, or any other components that may be used to run an application. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

Figure 3:
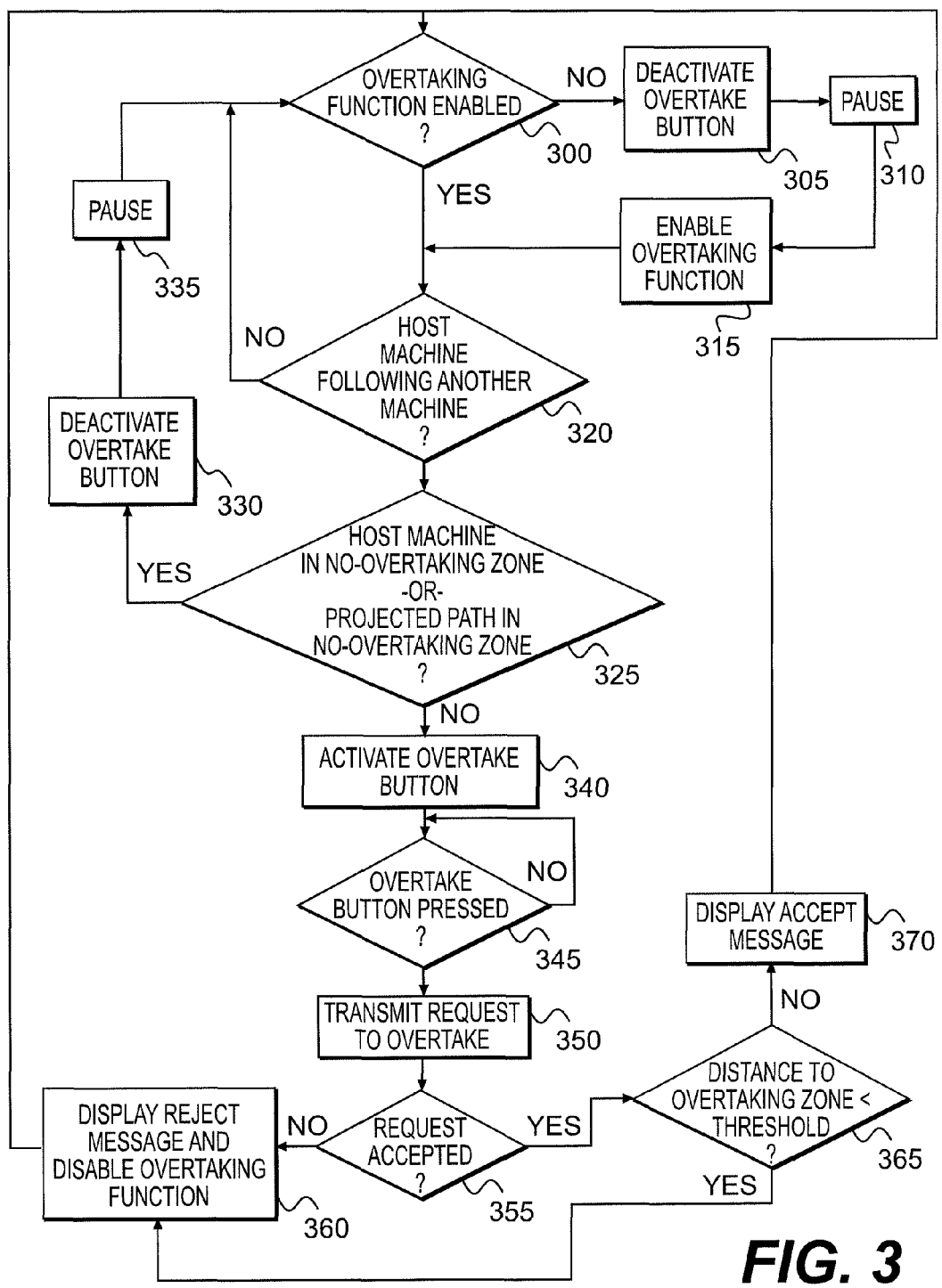
FIG. 3 is a flowchart depicting an exemplary disclosed control method that may be implemented by the overtaking control system of FIG. 2.

Overtaking control system 20 may be configured to execute instructions stored on computer readable medium to perform methods of overtaking control at worksite 10. FIG. 3 illustrates one example of these methods. FIG. 3 will be described in more detail below to further illustrate the disclosed concepts.

INDUSTRIAL APPLICABILITY

The disclosed overtaking control system finds potential application at any worksite having multiple simultaneously operating machines. The disclosed system finds particular application at worksites having machines with different capabilities, where overtaking operations may be desirable. The disclosed system may be configured to regulate overtaking operations, thereby helping to improve productivity and efficiency at the worksite. Operation of overtaking control system 20 will now be described in detail with reference to FIG. 3.

As shown in FIG. 3, operation of overtaking control system 20 may begin differently depending on whether an overtaking function is enabled (i.e., if a particular machine 12 is allowed to initiate overtaking of another machine 12 at worksite 10). Specifically, controller 28 of a host machine 12 (i.e., the machine 12 onboard which a particular controller 28 is mounted) may determine if the overtaking function is currently enabled (Step 300), and move to either step 305 or to step 320 based on the determination. The ways in which the overtaking function may be enabled or disabled will be described below. Controller 28 may determine if the overtaking function is currently enabled by checking a continuously changing list of function flags contained in memory.

If, at step 300, controller 28 determines that the overtaking function is disabled, controller 28 may responsively deactivate input device 26 (i.e., deactivate the overtake button included within display 34) (Step 305). In other words, when the overtaking function is disabled, controller 28 may inhibit the operator of machine 12 from depressing input device 26 and thereby requesting initiation of an overtaking event. After deactivating input device 26 in response to the disabled condition of the overtaking function, controller 28 may pause for a period of time before taking further action (Step 310). In one embodiment, controller 28 may pause for about 120 seconds, although other durations may also be possible. After the duration of the pause has elapsed, controller 28 may enable the overtaking function (i.e., controller 28 may change the status of the function flag in the stored listing) (Step 315). This pause circuit (steps 300-315) may allow conditions, which are unsuitable for initiation of the overtaking event, to change at worksite 10 before continuing in the control method.

Once the overtaking function is enabled (either following step 300 or step 315), controller 28 may determine if the host machine 12 is following another machine 12 (Step 320). Controller 28 may determine that the host machine 12 is following another machine 12 based on the location signal from locating device 22 and/or based on communication with worksite controller 30, which tracks movements of all machines 12 at worksite 10. If the host machine 12 is not following another machine 12, there may be no need to initiate the overtaking event and control will return to step 300.

However, when controller 28 determines that the host machine 12 is following another machine 12, for example within a threshold distance, controller 28 may then compare the current location of the host machine 12 and a projected path of the host machine 12 with the areas of worksite 10 designated as no-overtaking zones 19. That is, controller 28 may determine if the host machine 12 is currently within a no-overtaking zone 19 or if the projected path of the host machine 12 overlaps with a no-overtaking zone 19 (Step 325). The projected path of the host machine 12 may be determined based on the location signal, based on a current speed of the host machine 12 (determined, for example, based on changes in the location signal over time), and/or based on the current speed of the lead machine 12 to be overtaken. Specifically, controller 28 may determine a distance and location along travel path(s) 18 required for the host machine 12 to complete the overtaking event. When the current location or the projected path of the host machine 12 overlaps with a no-overtaking zone 19, controller 28 may deactivate the overtake button (i.e., change the status of input device 26 in display 34 to a non-selectable state) (Step 330). Controller 28 may then pause for a period of time before returning control to step 300 (Step 335). This pause may allow for conditions at worksite 10 to change and become more suitable for the overtaking event to occur (e.g., for the current location and/or the projected path to move and no longer overlap with the no-overtaking zone 19) (Step 335). In the disclosed embodiment, this pause may endure for about 30 seconds.

If, at step 325, however, controller 28 determines that the current location and the projected path of the host machine 12 do not overlap with a no-overtaking zone 19, controller 28 may activate the overtake button (i.e., controller 28 may change the status of input device 26 in display 34 to a selectable state) (Step 340). After completion of step 340, controller 28 may monitor manipulation of the overtake button. That is, controller 28 may continuously check to see if the operator of the host machine 12 has depressed or otherwise used input device 26 to indicate a desire for the host machine 10 to overtake the lead machine 12 traveling in front of the host machine (Step 345).

When controller 28 determines that the operator of the host machine 12 has depressed the overtake button, controller 28 may transmit (via communication device 24) a Request-To-Overtake message to worksite controller 30 (Step 350). Worksite controller 30 may forward the request on to the lead machine 12, and controller 28 of the host machine 12 may wait for a response back from the lead machine 12. When the response arrives, by way of worksite controller 30 and communication device 24, controller 28 may determine if the request was accepted (Step 355). The request may be accepted or rejected by the operator of the lead machine 12 for any number of different reasons. For example, the operator of the lead machine 12 may be aware of factors unknown to the operator of the host machine 12 that could affect the successfulness of the overtaking event. These factors could include, among other things, an intended change in travel parameters of the lead machine 12 (e.g., an upcoming turn of the lead machine 12 away from the current travel path 18), a change in road condition observable only by the operator of the lead machine 12, and other similar factors.

When controller 28 determines that the response from the operator of the lead machine 12 is negative (i.e., that the request to overtake has not been accepted), controller 28 may cause a Reject message to be shown on display 34, and disable the overtaking function (Step 360). Control may then return to step 300.

However, when controller 28 determines that the response from the operator of the lead machine 12 is affirmative (i.e., that the request has been accepted), controller 28 may confirm that a current distance from the host machine 12 to the next no-overtaking zone 19 in the travel direction of the host machine 12 is still sufficient for the host machine 12 to complete the overtaking event. In other words, it may take some time from when the overtake button was pushed by the operator of the host machine 12 until controller 28 determines that the response from the operator of the lead machine 12 is affirmative. And during this time, conditions affecting completion of the overtaking event may change. Accordingly, controller 28 may compare the distance from the current position of the host machine 12 (determined after receiving the affirmative response) to the no-overtaking zone 19 with a threshold distance to confirm that the overtaking event can still be completed successfully (Step 365). In the disclosed embodiment, the threshold distance may be about 200 m, although other distances may alternatively be used. If, at step 365, controller 28 determines that the distance from the host machine 12 to the no-overtaking zone 19 is less than the threshold distance, control may proceed to step 360.

However, when, at step 365, controller 28 determines that the overtaking event will still be successful (i.e., that the distance from the current location of the host machine 12 to the no-overtaking zone is not less than the predetermined distance), controller 28 may cause an Accept message to be shown on display 34. In response to seeing this message, the operator of the host machine 12 may then be allowed to initiate the maneuver. Alternatively, in embodiments where the host machine 12 is autonomously or semi-autonomously controlled, the overtaking maneuver may then be automatically initiated. Control may return from step 370 to step 300.

Because the disclosed system may allow the driver of the leading machine 12 to affect the decision to allow the trailing host machine 12 to initiate an overtaking event, it may be more likely that the overtaking event is completed successfully. That is, it may be less likely that the driver intentions of the leading machine 12 contradict the driver intentions of the trailing machine 12. And in this way, the two drivers may cooperate to complete the event.

In addition, the disclosed system may help ensure that the overtaking event can be accomplished successfully for given travel parameters of the leading and trailing machines 12. In particular, because the disclosed system may consider the projected path of the trailing machine 12 (taking into account travel speeds of both machines 12 and a distance to the next no-overtaking zone 19), the disclosed system may improve the likelihood that the trailing machine 12 can complete the overtaking event in the given distance. Further, in situations where the overtaking event cannot be completed successfully, the system may inhibit the driver of the following machine 12 from initiating the overtaking event. The disclosed system may inhibit the driver from initiating the overtaking event by deactivating the overtake button and therewith providing a visual indication that initiation of the event is not allowed.

It will be apparent to those skilled in the art that various modifications and variations can be made to the overtaking control system of the present disclosure. Other embodiments will be apparent to those skilled in the art from consideration of the specification and practice of the overtaking control system disclosed herein. It is intended that the specification and examples be considered as exemplary only, with a true scope being indicated by the following claims and their equivalents.

What is claimed is:

1. An overtaking control system for use with a plurality of machines operating at a common worksite, the overtaking control system comprising:
   an input device located within a cabin of a first machine of the plurality of machines and configured to receive an input from an operator of the first machine and generate a corresponding signal indicative of a desire to overtake a second machine of the plurality of machines;
   a location device associated with the first machine and configured to generate a location signal indicative of a location of the first machine at the common worksite; and
   at least one controller in communication with the input device and the location device, the at least one controller being configured to:
      make a comparison of a projected path of the first machine with a map of the common worksite based on the location signal; and
      selectively activate the input device only when the comparison indicates that the projected path of the first machine does not overlap with a no-overtaking zone at the common worksite.

2. The overtaking control system of claim 1, wherein the at least one controller is further configured to:
   determine a first distance between the first and second machines based on the location signal; and
   selectively activate the input device only when the first distance is less than a first threshold distance.

3. The overtaking control system of claim 2, wherein:
   the at least one controller is further configured to determine a current location of the first machine based on the location signal; and
   the at least one controller is configured to selectively activate the input device only when the current location and the projected path do not overlap with the no-overtaking zone.

4. The overtaking control system of claim 3, further including a communication device, wherein the at least one controller is further configured to:
   detect receipt of the input via the input device; and
   responsively transmit a request to the second machine to overtake the second machine.

5. The overtaking control system of claim 4, wherein the at least one controller is configured to responsively transmit the request only if the first machine is within the first threshold distance of the second machine and the current location and projected path of the first machine does not overlap with the no-overtaking zone.

6. The overtaking control system of claim 5, wherein the at least one controller is further configured to:
   receive, via the communication device, a response from the second machine; and
   selectively allow the first machine to overtake or inhibit the first machine from overtaking the second machine based on the response.

7. The overtaking control system of claim 6, further include a display located within a cabin of the first machine, wherein the at least one controller is in communication with the display and configured to selectively allow the first machine to overtake the second machine by causing an allow message to be shown on the display.

8. The overtaking control system of claim 6, further include a display located within a cabin of the first machine, wherein the at least one controller is in communication with the display and configured to selectively inhibit the first machine to overtake the second machine by causing a reject message to be shown on the display and by deactivating the input device.

9. The overtaking control system of claim 8, wherein the at least one controller is configured to deactivate the input device based on the response from the second machine for a predetermined period of time.

10. The overtaking control system of claim 9, wherein the predetermined period of time is about equal to 30 seconds.

11. The overtaking control system of claim 9, wherein the at least one controller is further configured to deactivate the input device when the current location or the projected path of the first machine overlaps with the no-overtaking zone.

12. The overtaking control system of claim 11, wherein the at least one controller is configured to deactivate the input device for about 120 seconds when the current location or the projected path of the first machine overlaps with the no-overtaking zone.

13. The overtaking control system of claim 6, wherein the at least one controller is further configured to:
    determine a second distance from the first machine to the no-overtaking zone based on the location signal; and
    selectively inhibit overtaking of the second machine by the first machine when the second distance is less than a second threshold distance, regardless of the response from the second machine.

14. The overtaking control system of claim 13, wherein the second threshold distance is about 200 m.

15. The overtaking control system of claim 1, wherein the at least on controller includes:
    a first controller located onboard the first machine;
    a second controller located onboard the second machine; and
    a worksite configured to relay transmissions between the first and second controllers.

16. An overtaking control system for use with a plurality of machines operating at a common worksite, the overtaking control system comprising:
    an input device located within a cabin of a first machine of the plurality of machines and configured to receive an input from an operator of the first machine and generate a corresponding signal indicative of a desire to overtake a second machine of the plurality of machines;
    a communication device associated with the first machine; and
    at least one controller connected with the input device and the communication device, the at least one controller being configured to:
        detect receipt of the input from the operator via the input device;
        transmit to the second machine, via the communication device, a request to overtake the second machine based on the input;
        receive a response to the request from the second machine via the communication device; and
        selectively allow the first machine to overtake or inhibit the first machine from overtaking the second machine based on the response.

17. The overtaking control system of claim 16, further including a location device configured to generate a location signal indicative of a location of the first machine, wherein the at least one controller is further configured to:
    determine a distance between the first and second machines based on the location signal; and
    selectively activate the input device only when the distance is less than a threshold distance.

18. The overtaking control system of claim 16, wherein the at least one controller is further configured to:
    determine a distance from the first machine to a no-overtaking zone based on the location signal; and
    selectively inhibit overtaking of the second machine by the first machine when the distance is less than a threshold distance, regardless of the response from the second machine.

19. A method of navigational control for a plurality of machines operating at a common worksite, the method comprising:
    making a comparison of a projected path of a first machine of the plurality of machines with a map of the common worksite;
    selectively activating an input device only when the comparison indicates that the projected path of the first machine does not overlap with a no-overtaking zone;
    receiving, via the input device only when the input device is activated, an input from an operator of the first machine that is indicative of a desire to overtake a second machine of the plurality of machines;
    transmitting to the second machine a request to overtake the second machine;
    receiving a response to the request from the second machine; and
    selectively allowing the first machine to overtake or inhibiting the first machine from overtaking the second machine based on the response.

20. The method of claim 19, further including:
    determining a first distance between the first and second machines and a second distance from the first machine to the no-overtaking zone;
    selectively activate the input device only when the first distance is less than a first threshold distance; and
    selectively inhibiting overtaking of the second machine by the first machine when the second distance is less than a second threshold distance, regardless of the response from the second machine.

* * * * *